United States Patent [19]

Vischer et al.

[11] 4,032,748

[45] June 28, 1977

[54] SCALE DEPOSIT REMOVAL ARRANGEMENT FOR ELECTRIC WATER HEATERS AND VAPORIZERS

[75] Inventors: William Vischer, Palatine; Orest A. Kozinczuk, Chicago; Robert J. Shulz, Brookfield, all of Ill.

[73] Assignee: Innovative Process Equipment, Inc., Palatine, Ill.

[22] Filed: Oct. 10, 1975

[21] Appl. No.: 621,304

[52] U.S. Cl. .............................. 219/275; 138/140; 165/84; 165/95; 165/180; 219/300; 219/302; 219/304; 219/306;

[51] Int. Cl.[2] ...................... F24H 1/16; F22B 1/28; F28G 5/00 F28F/21/06

[58] Field of Search .......................... 219/296–309, 219/310, 312, 322, 271–276; 165/95, 84, 180, 46; 128/214, 399; 138/140

[56] References Cited

UNITED STATES PATENTS

| | | | |
|---|---|---|---|
| 1,840,834 | 1/1932 | Davis | 165/84 X |
| 2,097,581 | 11/1937 | Beyrodt | 219/304 X |
| 2,682,391 | 6/1954 | Downs | 165/180 X |
| 3,228,456 | 1/1966 | Brown et al. | 165/180 X |
| 3,250,723 | 5/1966 | Fortney | 219/273 X |
| 3,364,336 | 1/1968 | Lippo | 219/273 X |
| 3,417,786 | 12/1968 | Schnabel | 138/140 |
| 3,475,590 | 10/1969 | Pins | 128/399 X |
| 3,680,630 | 8/1972 | Watts | 165/180 X |
| 3,921,708 | 11/1975 | Brenner | 165/84 |

*Primary Examiner*—A. Bartis
*Attorney, Agent, or Firm*—Edmond T. Patnaude

[57] ABSTRACT

A Teflon tube is loosely fitted into a guide passageway in a metallic heat transfer member. The tube has a water inlet at one end and an outlet at its other end. One end of the tube extends freely from an end of the passageway and the tube is movable both linearly and diametrically in the passageway so that the tube can expand both in length and cross sectional area independently of the heat transfer member. The tube has a coefficient of expansion greater than that of the heat transfer member whereby the expansion and contraction of the tube as its temperature fluctuates loosens deposited salt crystals from the surface of the tube for expulsion by the water passing therethrough. The heat transfer member may be either directly or indirectly electrically heated. The space between the tube and passageway wall may be filled with a heat conductive material which is liquid at the operating temperature of the heat transfer member.

10 Claims, 6 Drawing Figures

SCALE DEPOSIT REMOVAL ARRANGEMENT FOR ELECTRIC WATER HEATERS AND VAPORIZERS

The present invention relates in general to heat exchangers, and it relates more particularly to a new and improved apparatus and system for heating water containing ionic impurities which are precipitated from the water during the heating thereof.

BACKGROUND OF THE INVENTION

Salt crystals deposited on the heat transfer surfaces of water heaters and steam generators have long presented a major problem. Such deposits not only impair the transfer of heat to the water, but in those designs wherein the water passes through heat transfer tubes or passageways, the salt deposits restrict the flow of water through the unit. The problem is particularly acute in small steam generators and in small hot water heaters as used, for example, in home type coffee makers and the like.

SUMMARY OF THE INVENTION

Briefly, in accordance with the teachings of the present invention a relatively low mass plastic tube is loosely fitted in a passageway in a heated metallic heat transfer member, and the water to be heated to passed through the plastic tube wherein it is heated. Preferably, the water if fed into the plastic tube in pulses sufficiently separated to cause the temperature of the tube to fluctuate between pulses, whereby the plastic tube expands and contracts to dislodge any salts deposited on the wall surface therein. The major variation in the length of the tube occurs when the temperature varies between the operating temperature of say 450° F and room temperature as, for example, at the beginning and end of each day. In one embodiment of the invention the space between the plastic tube and the heat transfer member is filled with a heat conductive liquid such as silicone oil or with a low melting point metal such as bismuth. The liquid provides a good heat transfer medium between the heated member and the plastic tube while permitting tube to expand and contract relative to the wall of the passageway in which it is mounted. In another embodiment of the invention a solid core member, rectangular in cross-section, extends through the center of the plastic tube, and in still another embodiment an electric heating element extends through the solid core.

BRIEF DESCRIPTION OF THE DRAWING

Further objects and advantages and a better understanding of the present invention can be had by reference to the following detailed description, wherein:

Referring to FIG. 1 of the drawings, a steam generator 10 comprises a tubular housing member 11 formed of a good heat conductive material such as aluminum, a circular bottom member 12 sealably secured over the bottom of the member 11 by means of a plurality of socket heat cap screws 13, and a cover member 14 sealably secured over the top of member 11. A wire mesh screen 15 is positioned over the member 11 to function as a coalescing grid to prevent water droplets as well as entrained solids from entering a steam outlet port 17 in the cover 14.

Figure 1:
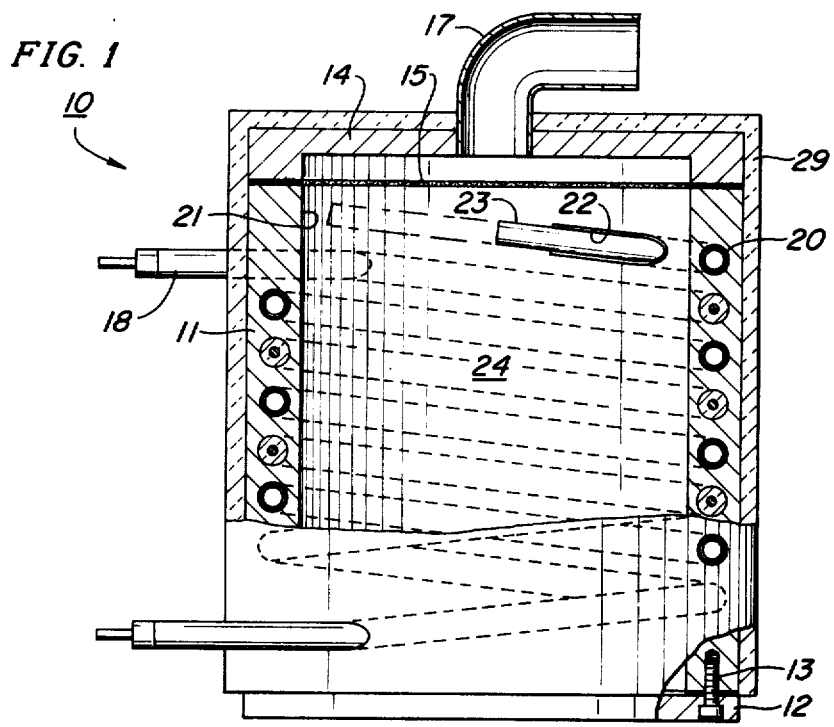
FIG. 1 is an elevational view, partly sectioned, of a steam generator embodying features of the present invention.

An electric heating element 18 is arranged in a helix and cast directly in the housing member 11 whereby the member 11 is heated by the passage of electric current through the element 18. A guide tube 20 formed of a good heat conductive material such as stainless steel or copper is also arranged in a helix and cast directly in the housing member 11 with the turns of the two helices being interposed. The inner wall 21 of the housing member 11 is cut away as shown at 22 so that the upper end of the tube 20 opens in a substantially tangential direction into a cylindrical central chamber 24 in the housing. If desired, the separate guide tube 20 may be omitted whereby the helical passageway is cast directly in the member 11.

A plastic tube 23, formed, for example of polytetrafluroethylene and sold by E. I. duPont deNemours under the trademark TEFLON, is loosely fitted in the tube 20 so as to permit the tube 23 to expand and contract independently of the tube 20. We have found that a tube 20 having an internal diameter of 0.325 inch and a tube 23 having an external diameter of 0.310 inch provide a satisfactory amount of clearance. At room temperature the upper end of the tube 23 extends out of the tube 20 a short distance of say, ½ inch, into the central chamber of the unit. At 450° F the tube extends about 3¼ inches into the central chamber as shown in phantom. The lower ends of the tubes 20 and 23 are flush and connected to a suitable water inlet fitting (not shown). As is explained more fully hereinafter in connection with FIG. 5, small pulses or charges of water of, for example, 6ml are fed into the lower end of the tube 23 every fifteen seconds. The overall tube 23 has a volume of about 60ml. When the water enters the tube 23 the temperature of the tube 23 decreases causing the tube 23 to contract and dislodge salt crystals previously deposited thereon. The member 11 is preferably heated to a temperature of about 450° F before the water is supplied thereto so that the water flashes into steam and carries the dislodged solids into the central chamber. The clean steam passes upwardly from the central chamber through the screen 15 and out of the generator through the outlet tube 17 from which it is coupled to the work area. The volume of each charge is not critical and may be, in some cases, up to one-half the total volume of the tube 23, but we have found that a charge volume of one-tenth the total volume of the tube 23 provides relatively dry steam at the outlet 17.

Figure 2:
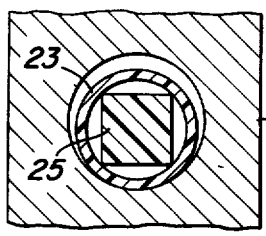
FIG. 2 is a fragmentary enlarged sectional view of a heat exchanger incorporating another embodiment of the invention.

As shown in FIG. 2, a solid square core piece 25 may be fitted into the plastic tube 23 to increase the surface to volume ratio of the water being heated. The core 25 may be formed of the same material as is the tube 23 and has a diagonal dimension slightly less than the internal diameter of the tube 23.

Figure 3:
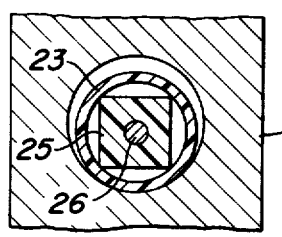
FIG. 3 is a view, similar to that of FIG. 2, of still another embodiment of the invention.

As shown in FIG. 3, in accordance with another embodiment of the invention a resistance heating element 26 may extend through the core 25 to provide a source of heat for the water in the tube 23.

Figure 4:
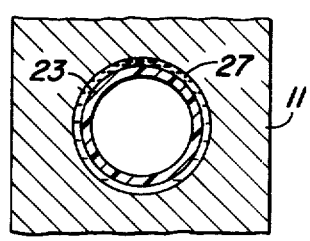
FIG. 4 is another view, similar to that of FIG. 3, of a further embodiment of the invention.

As shown in FIG. 4, the space between the lower portion of the tube 23 and the wall of the guide passageway in which it is disposed may be filled with a material 27 which is in the liquid state at the operating temperature of the system. A silicone oil, a low melting point metal such as bismuth or a fuse alloy, or a heat transfer salt may thus be used for this purpose. The liquid provides a good heat conductive interface between the tube 23 and the tube 20 while permitting the tube 23 to freely expand and contract as its temperature increases and decreases.

Figure 5:
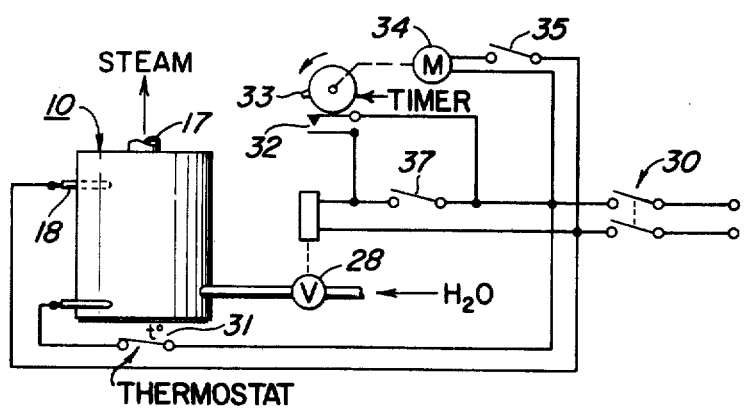
FIG. 5 is a circuit diagram of a stream generating system embodying the present invention.

Referring to FIG. 5, a source of water under pressure is coupled through a solenoid controlled water inlet valve 28 to the water inlet at the bottom of the steam generator 10. A pair of electric power lines are respectively connected through a double pole double throw main switch 30 and through a thermostatic switch 31 to the heating element 18 for maintaining the generator at a predetermined temperature. The thermostat 31 is preferably mounted between the outside wall of the housing member 11 and an insulating cover 29.

In order to controllably energize the control solenoid of the valve 28, a cam operated switch 32 is serially connected with the control solenoid of the valve and the main switch 30 across the power source. A switch actuating cam 33 is driven by a timer motor 34 which is serially connected with a switch 35 across the output terminals of the main switch 30 for periodically opening the water inlet valve 28.

In operation, the main switch 30 is closed to energize the control circuit and also to supply current to the heating coil 18. After the generator 10 has reached the operating temperature, the switch 35 may be closed whenever steam is required. With the switch 35 closed, the motor 34 drives the cam 33 at a constant speed to open the water inlet valve 28 for a period of about ½ second every 15 seconds. While the valve 28 is open a pulse or charge of water is fed into the tube 23. In a tube 23 having a length of 70 inches, we have found that a charge filling the lower 6 inches of the tube provides relatively dry steam from the unit. Each time that water is fed into the tube 23 the temperature of the tube 23 quickly decreases to cause it to contract both in length and in cross-section. Depending on its purity, in about 4 to 6 seconds the charge of water flashes into steam which passes through the tube 23 into the central chamber in a generally tangential direction causing the steam to swirl in the chamber and the solids to be centrifuged against the chamber wall. During the time that the valve 28 is closed after the steam has been generated, the temperature of the tube 23 increases whereby it expands in both length and cross-section. It is important, therefore, that the tube 23 be free from the guide tube 22 so that the temperature thereof may fluctuate and the tube 23 may be expand and contract a sufficient amount to dislodge the deposited salt crystals.

Should it be desired to supply water at a continuous rate to the generator, a manual switch 37, which is spring biased in an open position, is connected in parallel with the cam operated switch 32. Accordingly, while the switch 37 is held closed, water is supplied to the tube 23.

Figure 6:
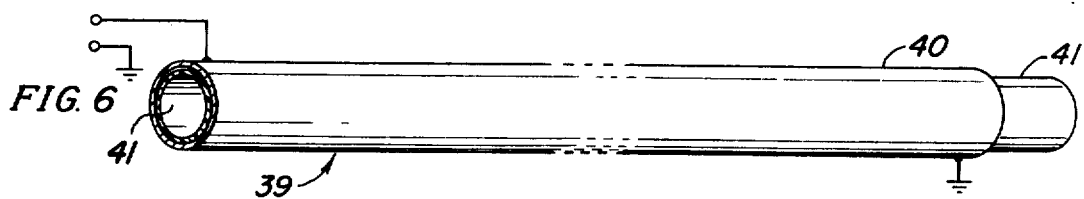
FIG. 6 is a fragmentary view of another embodiment of the invention.

Referring to FIG. 6, a heat exchanger 39 includes a heat transfer and guide tube 40 which is formed of an electric resistance material. A plastic tube 41 is loosely fitted in the tube 40 to permit independent contraction and expansion thereof as in the case of the tube 23. For use as a water heater, electric current is passed through the tube 40 to maintain its temperature at a desired value of, for example, 175° F and water is passed through the plastic tube 41 when hot water is demanded. While water is flowing through the tube 41 the temperature of the tube 41 decreases and is less than when the flow stops. Since the normal demand for hot water is not constant, the tube 41 intermittently expands and contracts to dislodge any salt crystals precipitated out of the water and deposited on the wall of the tube. The subsequent flow of water through the tube carries the dislodged particles out of the tube. In use, the tubes 40 and 41 will generally be disposed in a vertical position with water flow from top to bottom and with the control valve positioned below the bottom of the tubes whereby the inner tube remains filled with water at all times.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention .

What is claimed:

1. A heat exchanger for heating water containing dissolved solids, comprising in combination
    metallic heat transfer means having a guide passageway therethrough,
    means for heating said heat transfer means,
    a plastic tube having a coefficient of thermal expansion substantially greater than that of said heat transfer means,
    said tube having a water inlet at one end and a fluid outlet at the other end,
    said tube being coaxially disposed within said passageway in heat transfer relationship therewith,
    said tube being sufficiently smaller in external cross-section than the internal cross-section of said passageway and being movable in said passageway with at least one end of said tube extending freely from one end of said passageway so that said tube may expand independently of said heat transfer means in both length and cross-sectional area,
    whereby expansion and contraction of said tube dislodges salt crystals deposited on the interior wall thereof.

2. A heat exchanger according to claim 1 wherein said plastic tube is formed of polytetrafluroethylene.

3. A heat exchanger according to claim 1 wherein the space between said tube and the wall of said passageway is filled with a material which is in the liquid state in the operating temperature range of said exchanger.

4. A heat exchanger according to claim 1 wherein said heat transfer means comprises
    a heatable tube formed of a resistive material,
    means for passing current through said heatable tube to heat same, and
    the internal surface of said heatable tube providing said passageway.

5. A heat exchanger according to claim 1 wherein said heat transfer means comprises
    a housing having a chamber therein, said means for heating including a heating element extending in a helix surrounding said chamber, and said guide passageway being a helix surrounding said chamber and opening at one end into said chamber, said at least one end of said tube extending from said heat transfer means into said chamber.

6. A heat exchanger according to claim 5, further comprising, a screen mounted over the top of said chamber, and an outlet from said housing disposed above said screen.

7. A heat exchanger according to claim 6 wherein said passageway opens in a substantially tangential direction into said chamber at said one end of said passageway.

8. A heat exchanger according to claim 5 comprising a control valve through which water is supplied to said tube, and timer means for periodically opening and closing said valve to intermittently charge said tube with water, said valve being open for a period whereby said tube is only partially filled with the water and said valve is subsequently closed for a sufficient time to permit all of the water in said tube to be evaporated.

9. A heat exchanger according to claim 8 wherein said water inlet is at the bottom, and each said charge of water fills less than one-half of said tube.

10. A heat exchanger according to claim 8 wherein the turns of said heating element and said guide passageway are mutually interposed.

* * * * *